United States Patent
Kolam et al.

(10) Patent No.: US 9,648,136 B2
(45) Date of Patent: *May 9, 2017

(54) SMART PACKAGING FOR MOBILE APPLICATIONS

(71) Applicant: Instart Logic, Inc., Palo Alto, CA (US)

(72) Inventors: Hariharan Kolam, Palo Alto, CA (US); Manav Ratan Mital, San Carlos, CA (US); Raghu Batta Venkat, Palo Alto, CA (US); Abhishek Marwah, Belmont, CA (US); Prasenjit Dey, Bengaluru (IN)

(73) Assignee: Instart Logic, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/199,738

(22) Filed: Jun. 30, 2016

(65) Prior Publication Data

US 2016/0316042 A1    Oct. 27, 2016

Related U.S. Application Data

(63) Continuation of application No. 14/930,550, filed on Nov. 2, 2015, now Pat. No. 9,407,723, which is a continuation of application No. 14/626,351, filed on Feb. 19, 2015, now Pat. No. 9,210,101, which is a continuation of application No. 13/370,071, filed on Feb. 9, 2012, now Pat. No. 8,996,661.

(51) Int. Cl.
*G06F 15/16* (2006.01)
*H04L 29/08* (2006.01)
*G06F 9/44* (2006.01)
*H04L 12/26* (2006.01)
*G06F 9/445* (2006.01)
*H04L 12/923* (2013.01)
*H04L 29/06* (2006.01)

(52) U.S. Cl.
CPC ........... *H04L 67/34* (2013.01); *G06F 8/60* (2013.01); *G06F 8/70* (2013.01); *H04L 43/08* (2013.01); *H04L 43/0852* (2013.01); *H04L 43/16* (2013.01); *H04L 47/762* (2013.01); *H04L 67/02* (2013.01); *H04L 67/06* (2013.01); *H04L 67/2861* (2013.01); *H04L 67/42* (2013.01)

(58) Field of Classification Search
CPC ........ G06F 15/16; H04L 65/60; H04L 67/322
USPC .................................................. 709/203, 219
See application file for complete search history.

(56) References Cited

U.S. PATENT DOCUMENTS

| | | | | |
|---|---|---|---|---|
| 6,502,106 B1 * | 12/2002 | Gampper | .......... | G06F 17/30902 707/769 |
| 7,695,370 B2 * | 4/2010 | Liu | .......... | A63F 13/12 463/40 |
| 7,784,092 B2 * | 8/2010 | Pearson | .......... | H04L 63/0428 726/12 |

(Continued)

*Primary Examiner* — Anthony Mejia
(74) *Attorney, Agent, or Firm* — Van Pelt, Yi & James LLP

(57) ABSTRACT

A method of distributing content to an application from a server is disclosed. The method includes detecting in a file to be sent to the application from the server that the application is directed to request one or more resources to be downloaded to the application. A network latency associated with the downloading of the one or more resources is determined. A subset of the one or more resources is selectively packaged based at least in part on the network latency. The selectively packaged subset of the one or more resources is sent to the application.

12 Claims, 9 Drawing Sheets

(56) References Cited

U.S. PATENT DOCUMENTS

| | | | | |
|---|---|---|---|---|
| 7,823,166 B2* | 10/2010 | Wu | G06F 17/2247 | 709/242 |
| 7,826,496 B2* | 11/2010 | Gatto | H04L 29/06 | 370/230 |
| 8,224,964 B1* | 7/2012 | Fredrickson | H04L 29/08729 | 709/227 |
| 8,275,790 B2* | 9/2012 | Fredricksen | G06F 17/30011 | 707/741 |
| 8,626,919 B1* | 1/2014 | Papakipos | G06F 9/44521 | 709/226 |
| 2002/0010798 A1* | 1/2002 | Ben-Shaul | G06F 17/3089 | 709/247 |
| 2002/0073335 A1* | 6/2002 | Shuster | H04L 29/12066 | 726/7 |
| 2002/0120727 A1* | 8/2002 | Curley | H04L 41/12 | 709/223 |
| 2003/0014499 A1* | 1/2003 | Mighdoll | G06F 8/65 | 709/217 |
| 2003/0177247 A1* | 9/2003 | Dunning | G06F 17/30017 | 709/228 |
| 2004/0044731 A1* | 3/2004 | Chen | H04L 67/2842 | 709/203 |
| 2005/0160063 A1* | 7/2005 | Pan | G06F 17/30575 | |
| 2006/0059212 A1* | 3/2006 | Carro | G06F 17/30876 | |
| 2007/0006229 A1* | 1/2007 | Moore | H04L 12/5693 | 718/100 |
| 2007/0184902 A1* | 8/2007 | Liu | A63F 13/12 | 463/42 |
| 2008/0263536 A1* | 10/2008 | Duggan | H04L 51/14 | 717/168 |
| 2008/0285496 A1* | 11/2008 | Fuchs | H04L 67/06 | 370/311 |
| 2008/0301135 A1* | 12/2008 | Alves | G06F 17/30442 | |
| 2009/0203451 A1* | 8/2009 | Gatto | H04L 29/06 | 463/42 |
| 2010/0161760 A1* | 6/2010 | Maloo | H04L 29/12066 | 709/219 |
| 2010/0235542 A1* | 9/2010 | Visharam | G06F 15/16 | 709/246 |
| 2010/0293281 A1* | 11/2010 | Tsimelzon | G06F 11/203 | 709/228 |
| 2011/0016382 A1* | 1/2011 | Cahill | G06F 17/30896 | 715/234 |
| 2011/0197126 A1* | 8/2011 | Arastafar | G06F 17/30905 | 715/243 |
| 2011/0199899 A1* | 8/2011 | Lemaire | H04L 47/2416 | 370/230.1 |
| 2011/0202608 A1* | 8/2011 | Nassar | G06Q 10/107 | 709/206 |
| 2012/0042076 A1* | 2/2012 | Kawa | G06F 9/50 | 709/226 |
| 2012/0084821 A1* | 4/2012 | Rogers | H04N 21/2225 | 725/93 |
| 2013/0054691 A1* | 2/2013 | Calo | H04L 67/1091 | 709/204 |
| 2013/0066877 A1* | 3/2013 | Raanan | G06F 9/445 | 707/741 |
| 2013/0073689 A1* | 3/2013 | Kolam | H04L 67/34 | 709/219 |
| 2013/0116022 A1* | 5/2013 | Davison | A63F 13/5375 | 463/9 |
| 2013/0324263 A1* | 12/2013 | Ahiska | H04L 65/105 | 463/42 |

* cited by examiner

| |
|---|
| Characters |
| Sheep.jpg |
| Strawberry.jpg |
| Cat.mpeg |
| . <br> . <br> . |
| Symbol Table |
| actionscripts |
| Timeline <br>  new sheep() <br>  new cat() <br>     . <br>     . <br>     . <br>  screen.display(sheep, x, y) |

FIG. 2

```
<html>
  <head>
    <title>Welcome</title>
  </head>
  <body>
    <h1>HelloWorld </h1>
         .
         .
         .
    <img src = "url for image"/>
    <video>
       <source src = "url for video" type = "video/ogg"  />
    </video>
    <script type = "text/javascript">
    <!--script
    *** Some javascript code is placed here ***
    -->
    </script>
  </body>
</html>
```

Script

FIG. 3

SMART PACKAGING FOR MOBILE APPLICATIONS

CROSS REFERENCE TO OTHER APPLICATIONS

This application is a continuation of co-pending U.S. patent application Ser. No. 14/930,550, entitled SMART PACKAGING FOR MOBILE APPLICATIONS, filed Nov. 2, 2015, which is a continuation of U.S. patent application Ser. No. 14/626,351, now U.S. Pat. No. 9,210,101, entitled SMART PACKAGING FOR MOBILE APPLICATIONS, filed Feb. 19, 2015, which is a continuation of U.S. Pat. No. 13/370,071, now U.S. Pat. No. 8,996,661, entitled SMART PACKAGING FOR MOBILE APPLICATIONS, filed Feb. 9, 2012, all of which are incorporated herein by reference for all purposes.

BACKGROUND OF THE INVENTION

Some computer applications require the downloading of resources through a client-server connection over a network before the applications can start. The long startup time may deter some end users from using the applications. Therefore, improved techniques for downloading the resources for these applications would be desirable.

BRIEF DESCRIPTION OF THE DRAWINGS

Various embodiments of the invention are disclosed in the following detailed description and the accompanying drawings.

FIG. 2 is a diagram illustrating an embodiment of a Small Web Format (SWF) file.

FIG. 3 is a diagram illustrating an embodiment of a webpage described by an HTML file.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
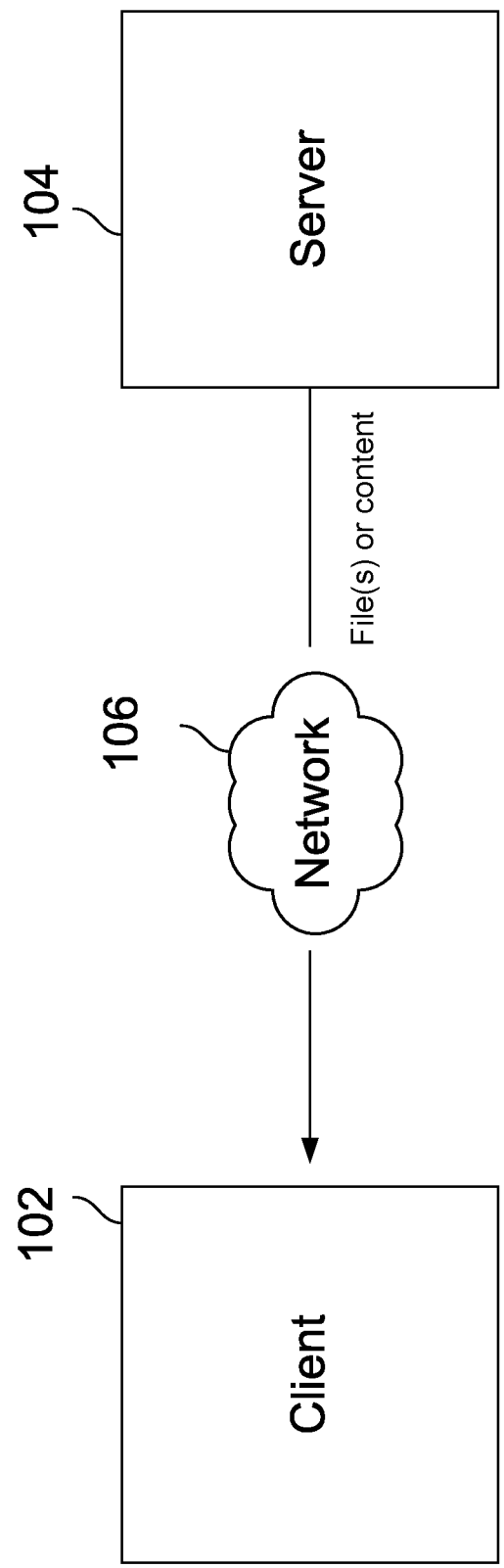
FIG. 1 is a block diagram illustrating an embodiment of a client-server connection through a network for downloading files or content for starting and loading an application on the client side.

FIG. 1 is a block diagram illustrating an embodiment of a client-server connection through a network for downloading files or content for starting and loading an application on the client side. As shown in FIG. 1, a client 102 is connected to a server 104 through a network 106. However, any number of clients and servers may be connected through network 106. Network 106 may be any combination of public or private networks, including intranets, local area networks (LANs), wide area networks (WANs), radio access networks (RANs), Wi-Fi networks, the Internet, and the like. Server 104 sends one or more files or other content through network 106 to client 102. In some embodiments, the one or more files or content sent by server 104 to client 102 are files or content required by client 102 before a process can start to run.

In some embodiments, the process that requires the one or more files from server 104 is a game application. For example, the game application may be a browser game, i.e., a computer game played over the Internet using a web browser. Browser games include social network games, such as FarmVille, Mafia Wars, FrontierVille, and the like. These social network games are online games that are distributed through social networks, e.g., Facebook, and may feature multiplayer gameplay mechanics. The popular browser-based social network game, FarmVille, is used hereinafter as an example for the process or application described above. Farmville is selected for illustration purposes only; accordingly, the present application is not limited to this specific example only.

FarmVille is a farm simulation game available as an application on the social networking website Facebook. The game allows members of Facebook to manage a virtual farm by planting, growing, and harvesting virtual crops and trees or raising livestock. Before the application can start to run on the client side, one or more SWF (Small Web Format)

files are sent by server 104 to client 102 through network 106. These SWF files provide the application on the client side with the resources it needs for starting and running the game. SWF files can be used to present vector-based objects and images, audio, video, text, and other forms of interaction with the end user. After the one or more SWF files are received on the client side, the SWF files can be played by Adobe Flash Player as a browser plugin. For example, text can be displayed, audio can be played, and movie clips can be played as the game begins.

FIG. 2 is a diagram illustrating an embodiment of a SWF file. A SWF file has different sections, including the character, symbol table, and timeline sections. The character section is used to store content, such as images, movie clips, audio, and the like. For example, the character section of a SWF file sent by a FarmVille server may include image files (e.g., bitmap or jpeg files) and movie clips files (e.g., mpeg files) of various crops that may be planted on the farm, farm animals that can be raised on the farm, and the like. The timeline section has code to define how the animation of the game should progress over time. For example, the timeline may specify that a particular farm animal, e.g., a sheep, should be displayed at time t0 at a particular position on the screen. The symbol section includes code, e.g., actionscripts, for loading the image file (e.g., sheep.jpg or sheep.bmp) of the farm animal from the character section. The loaded image can then be displayed on the screen at the specified time and location. The symbol table section also includes character ID and class name information.

The number of SWF files for starting up FarmVille on the client side and the content of those SWF files are different for different player levels. As the player level increases, the number of SWF files for starting up FarmVille on the client side and the size of those SWF files may increase. This is because some characters are only made available to players at or above a certain player level.

Although each player level has a different set of startup SWF files, players at the same player level receive an identical set of SWF files. The set of startup SWF files for a particular player level is updated periodically to incorporate new features or new characters for the game. Since the set of startup SWF files for a particular player level is not dynamically generated for a particular game player by the game publisher (i.e., Zynga), some game players may receive characters in the set of SWF files that are never used during their respective games. As the size (in bytes) of each image or movie clip file is typically large, receiving unnecessary characters embedded in the set of startup SWF files on the client side over a network translates to a long startup or loading time for the game, especially for higher player levels. In some cases, the long startup time can even deter some game players from playing the game. Therefore, a technique to speed up the startup time for a process or application on the client side, without compromising the game player's experience, would be desirable.

In some embodiments, the process that requires the one or more files or content from server 104 (as shown in FIG. 1) is a web browser accessing a webpage. The webpage may be described by different markup languages, including Hypertext Markup Language (HTML), Extensible Markup Language (XML), and the like. The webpage may also be described by different scripting languages, including JavaScript Object Notation (JSON), and the like. HTML is used hereinafter as an example of the various languages for describing webpages. Note that the examples of HTML are selected for illustration purposes only; accordingly, the present application is not limited to these specific examples only.

FIG. 3 is a diagram illustrating an embodiment of a webpage described by an HTML file. To display the webpage, a web browser sends a Hypertext Transfer Protocol (HTTP) request message to a content server requesting the HTML webpage file. After the content server locates the requested HTML webpage file, the content server returns the requested HTML webpage file in an HTTP response message to the web browser. The web browser parses the received webpage file and begins to render a portion of the webpage, e.g., a text portion, on the screen.

As shown in FIG. 3, the webpage file may include one or more scripts. For example, the webpage may include a number of icons or buttons for a webpage viewer to click on. A script associated with a specific icon or button is executed on the client side only if the webpage viewer clicks on the corresponding icon or button. Since some of the icons or buttons on the webpage are never clicked by some webpage viewers when they are accessing the webpage, the webpage file received by these webpage viewers include unnecessary information and content that is sent through network 106. Receiving unnecessary information and content embedded in the HTTP response message on the client side over a network translates to a longer loading time for the webpage. Therefore, a technique to speed up the loading time for a process or application on the client side, without compromising the webpage viewer's experience, would be desirable.

In some embodiments, the process that requires the one or more files or content from server 104 (as shown in FIG. 1) includes other content fetching applications, such as email protocols, collaborative applications (e.g., Microsoft Exchange), File Transfer Protocol (FTP), and the like.

Figure 4:
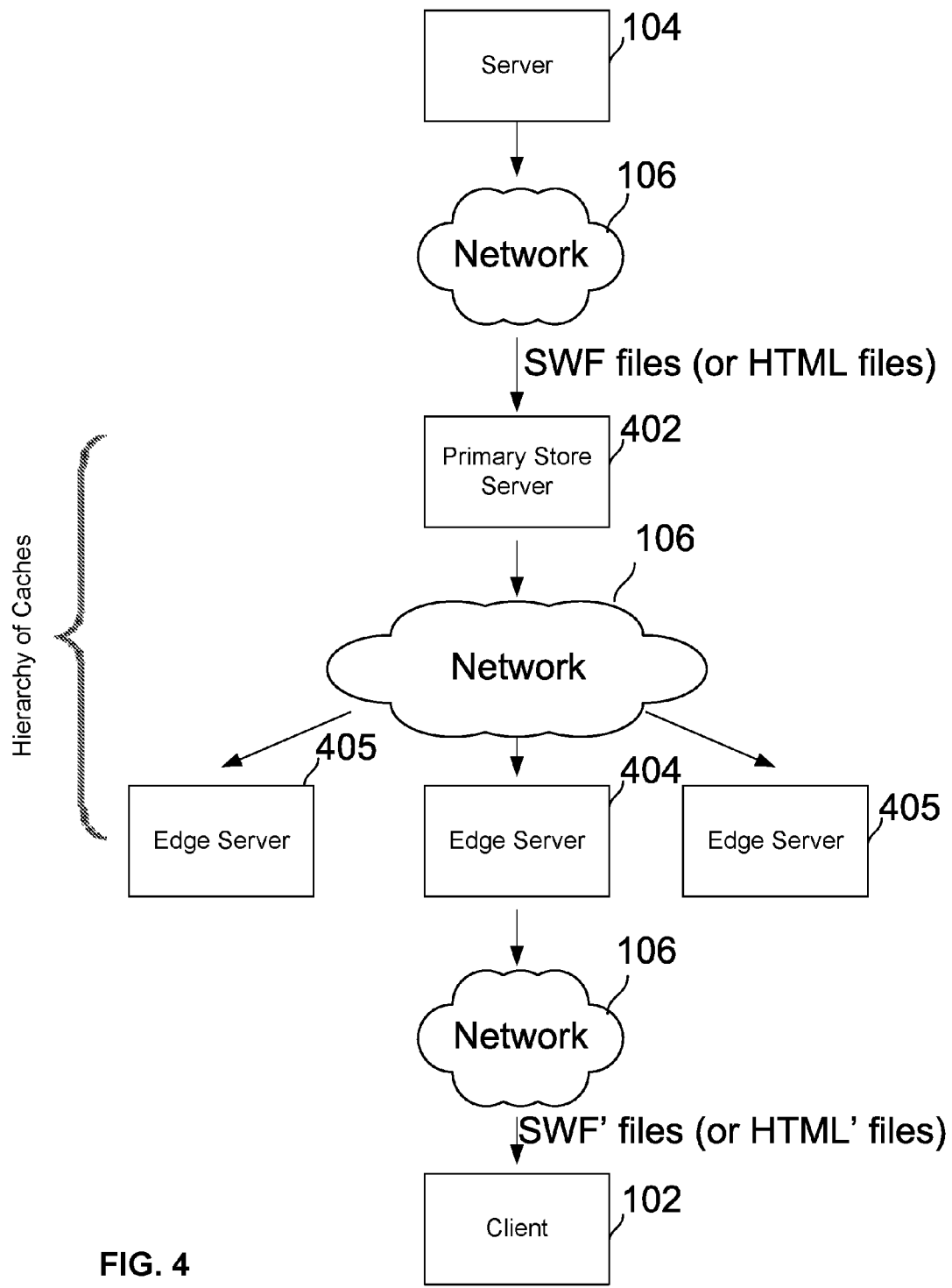
FIG. 4 is a diagram illustrating an embodiment of a client-server connection through a network for downloading files or content for starting or loading an application on the client side.

FIG. 4 is a diagram illustrating an embodiment of a client-server connection through a network for downloading files or content for starting or loading an application on the client side. Continuing with the FarmVille illustrative example above, client 102 no longer receives the startup files for running the FarmVille browser game directly from server 104 (as shown in FIG. 1) but from an edge server 404 other than server 104. In some embodiments, the edge server 404 that the client is receiving the startup files from is one of a plurality of edge servers (404 and 405) in a content delivery network or content distribution network (CDN). For example, edge server 404 that is connected to client 102 is the edge server that is located geographically closest to client 102.

With continued reference to FIG. 4, server 104 has access to the original startup SWF files provided by the game publisher of FarmVille (i.e., Zynga). These original startup SWF files are the SWF files that are normally downloaded by the user's browser when the game is started. As shown in FIG. 4, a primary store server 402 periodically obtains the most updated version of these original startup SWF files from server 104. In some embodiments, primary store server 402 stores a copy of the original startup SWF files in a local cache/memory of primary store server 402. In some embodiments, primary store server 402 breaks down the SWF files into portions, e.g., into one or more partial SWF files. The one or more partial SWF files can be non-overlapping or overlapping. The degree of granularity of the partial SWF files can be different. For example, a partial SWF file may be an image file included in the character section of a SWF file. In another example, a partial SWF file is the entire SWF file itself. In yet another example, a partial SWF file is a skeleton SWF file (referred to hereinafter as a skeleton) with most or all of the characters removed. These one or more partial SWF files can be distributed among the local cache/memory of primary store server 402 and the local caches of one or more of the plurality of edge servers (404 and 405), as will be described in greater detail below.

With continued reference to FIG. 4, edge server 404 connected to client 102 includes a transformation module for generating modified startup SWF files (denoted SWF') for a particular player level and transmitting the SWF' files to client 102 upon the client's request. For example, if server 104 provides three startup SWF files (SWF1, SWF2, and SWF3) for starting the game at a particular player level, then three modified startup SWF' files (SWF1', SWF2', and SWF3') are dynamically generated by edge server 404 and sent to client 102. In some embodiments, the modified startup SWF' files are generated based on one or more partial SWF files. For example, a modified startup SWF' file is generated by combining multiple partial SWF files together, e.g., by combining a skeleton with a plurality of image files together.

The modified startup SWF' files are smaller in size (measured in bytes) than the original startup SWF files, thereby reducing the downloading time of the files and thus the startup time of the application. The modified startup SWF' files contain portions of the original startup SWF files. These initial portions provide resources for the initial functioning of the application. For example, only a portion of the characters embedded in the original startup SWF files are required for the initial functioning of the application. The initial portions for each player level and each player (or a group of players) may be determined empirically. For example, the initial portions may be determined based on statistics collected by the edge servers (404 and 405) in a profiling process, which will be described in greater detail below.

As described above, partial SWF files may be distributed among the local cache/memory of primary store server 402 and the local caches of one or more of the plurality of edge servers (404 and 405). The local cache of primary store server 402 and the local caches of the plurality of edge servers (404 and 405) form a hierarchy of caches for storing the partial SWF files. In some embodiments, a particular partial SWF file is determined to be stored in a particular local cache at least in part based on the profiling process. For example, if a partial SWF file is determined by the profiling process that the partial SWF file is frequently used for generating modified SWF' files for different clients, then a copy of the partial SWF file may be stored lower in the hierarchy of caches with relatively shorter latency paths to the clients, e.g., at one or more of the plurality of edge servers (404 and 405). In this case, since multiple copies are stored, more cache/memory space is required. However, the time needed for generating modified SWF' files by an edge server will be reduced because the partial SWF file does not have to be fetched from a remote location. Conversely, if a partial SWF file is determined by the profiling process that the partial SWF file is infrequently used for generating modified SWF' files for different clients, then a copy of the partial SWF file may be stored higher in the hierarchy of caches with relatively higher latency paths to the clients, e.g., at primary store server 402 only. In this case, since only a single copy is stored, less cache space is required. However, the time for generating modified SWF' files by an edge server will be increased because edge server 404 needs to fetch the partial SWF file prior to the generation of the modified SWF' files.

In some embodiments, the game publisher may include code in the game application to be executed on the game player's machine (e.g., a laptop or smartphone) such that when the game is started, the browser will request (e.g., using HTTP requests) for startup files from primary store server 402 or from one of the plurality of edge servers (404 and 406), instead of from server 104. However, other ways to redirect the file requests may be used as well.

Figure 5:
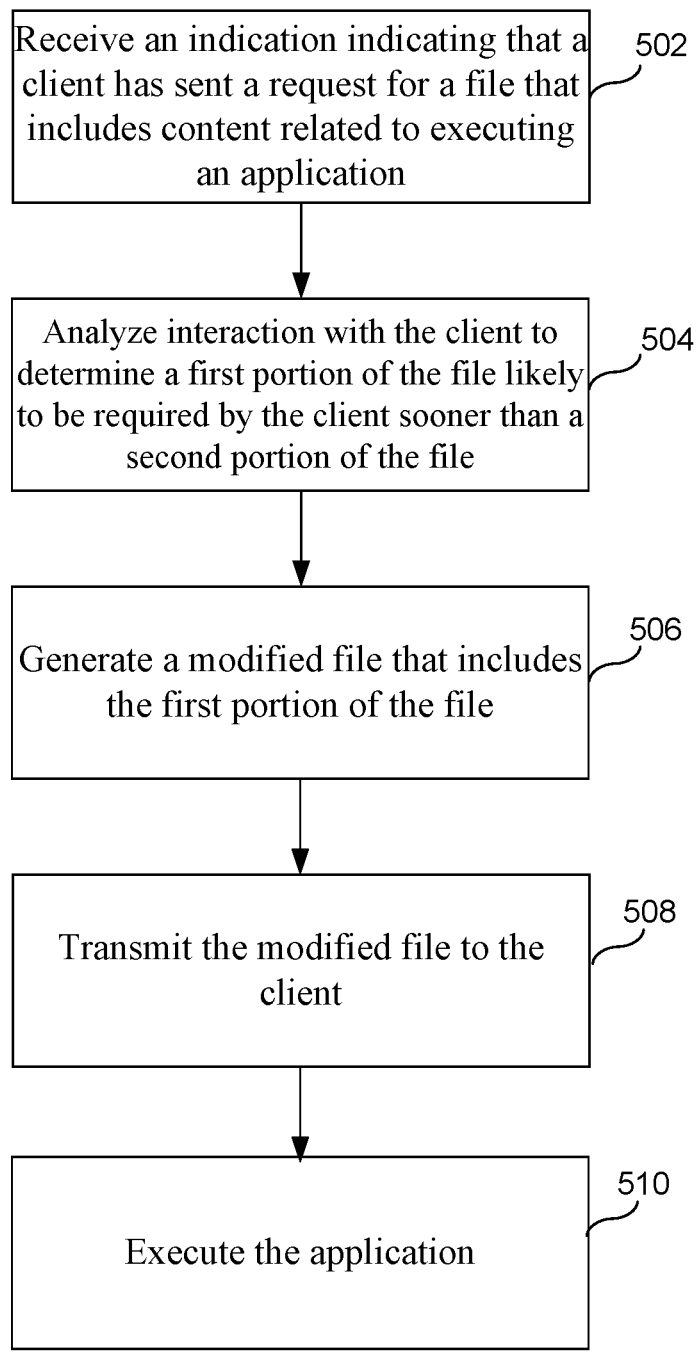
FIG. 5 is a diagram illustrating an embodiment of a process 500 for downloading a file from a server to a client, wherein the file is for starting and loading an application on the client side.

FIG. 5 is a diagram illustrating an embodiment of a process 500 for downloading a file from a server to a client, wherein the file is for starting and loading an application on the client side. At 502, an indication indicating that a client has sent a request for a file that includes content related to executing an application is received by an edge server. For example, the request may be an HTTP request for a startup SWF file containing content that is related to executing an application, such as a game application. In another example, the request is an HTTP request for an HTML webpage file. In some embodiments, the request is received by the edge server, and the indication is the request itself. In some embodiments, the request is received by a primary store server (e.g., primary store server 402 in FIG. 4) and an indication is sent from the primary store server to the edge server indicating that the client has sent the request for the file.

At 504, the edge server analyzes its interaction with the client to determine a first portion of the file that is likely to be required by the client for executing the application sooner than a second portion of the file. For example, the edge server analyzes its interaction with the client as part of a profiling process, as will be described in greater detail below. By analyzing its interaction with the client, the edge server may determine that the first portion of the file includes a subset of the characters embedded in an original startup SWF file provided by the game publisher. Continuing with the FarmVille illustrative example above, the first portion of the file may include the image or movie clip files of the most commonly planted crops or most commonly raised farm animals, background image files, the FarmVille logo, and the like. In other embodiments, the first portion of the file may include the image or movie clip files of the crops or animals that were previously planted or raised by a game player associated with the client.

At 506, the edge server generates a modified file that includes the first portion of the file, but not the second portion of the file. In some embodiments, the modified file is generated dynamically for a particular client. In some embodiments, the modified file is generated for a group of clients sharing similar characteristics. In the FarmVille example, the image or movie clip files of some of the less commonly planted crops or less commonly raised farm animals are not embedded in the character section of the modified startup SWF' file. In some embodiments, the first portion of the file is sufficient to permit initial functioning of the application. At 508, the generated modified file is transmitted to the client by the edge server.

With continued reference to FIG. 5, after the modified file is received, the application can be executed at 510. Continuing with the FarmVille illustrative example above, a game player associated with the client may begin to plant crops on the virtual farm, and so forth. For example, if the game player chooses to plant a particular crop and the image file for the crop is embedded in the character section of the modified startup SWF' file, then the application can begin to access the image file locally by accessing the modified startup SWF' file. If, however, the game player chooses to plant a particular crop and the image file for the crop is not embedded in the character section of the modified startup SWF' file, then the image file is accessed using a placeholder in the modified startup SWF' file.

In particular, the modified file is formatted with at least one placeholder for the second portion of the file. The at least one placeholder allows the application to access the second portion of the file. In some embodiments, the placeholder may be program code, data structures, interfaces, or a combination thereof, that allow the application to access the second portion of the file. As will be described in greater detail below, the second portion of the file may be fetched from one of the following: 1) one of the servers (the primary store server or the edge servers) through the network, or 2) a local cache, file system, or memory on the client device.

In some embodiments, the modified startup SWF' file includes program code, data structures, or interfaces from the original SWF file and also new code, data structures, or interfaces that are added by the edge server. In a SWF or SWF' file, a character is represented by a class. The class of a character is instantiated by calling the function "new( )" before the character is used in the application. Because a particular character may not be actually embedded in the character section of the modified SWF' file, a new class for the character is created. The new class may import the same interfaces of the original class. Program code for loading the image includes program code from the original SWF file and also new code added by the edge server. For example, the original program code that uses the character will call into the new code such that before a character is loaded, the character is looked up in one of the following three locations: 1) the character section of the modified SWF' files, 2) one of the servers (the primary store server or the edge server) through the network, or 3) a local cache, file system, or memory associated with the client.

The first location is the character section of the modified SWF' files. In the FarmVille example, image or movie clip files of some of the most commonly planted crops or most commonly raised farm animals, background image files, the FarmVille logo, and the like, can be embedded in the character section of the modified startup SWF' file.

The second location is one of the servers (the primary server or the edge servers). In the FarmVille example, image or movie clip files of some of the less commonly planted crops or less commonly raised farm animals are not embedded in the character section of the modified startup SWF' file. Therefore, if a game player chooses a character that falls into this category, the client will not be able to access its content from the modified startup SWF' file. Instead, the client needs to explicitly request (e.g., using HTTP requests) one of the servers to send the content for the character over the network. In this case, the game player enjoys a shorter startup time at the beginning of the game, but may experience some network latency at a later stage. After the content of the character is received, it is loaded by the application for immediate use. The content is also stored locally in the cache, in a file, or memory associated with the client for later retrieval.

The third location is the local cache, file system, or memory on the client device. In the FarmVille example, sometimes the contents for some of the characters are already stored in the local cache, file system, or memory of the game player's device (e.g., a laptop or smartphone) before a game is started. For example, if the game has been played on the device before, the contents for some of the characters that have been previously fetched from one of the servers can be found in the local cache, file system, or memory on the device.

Figure 6:
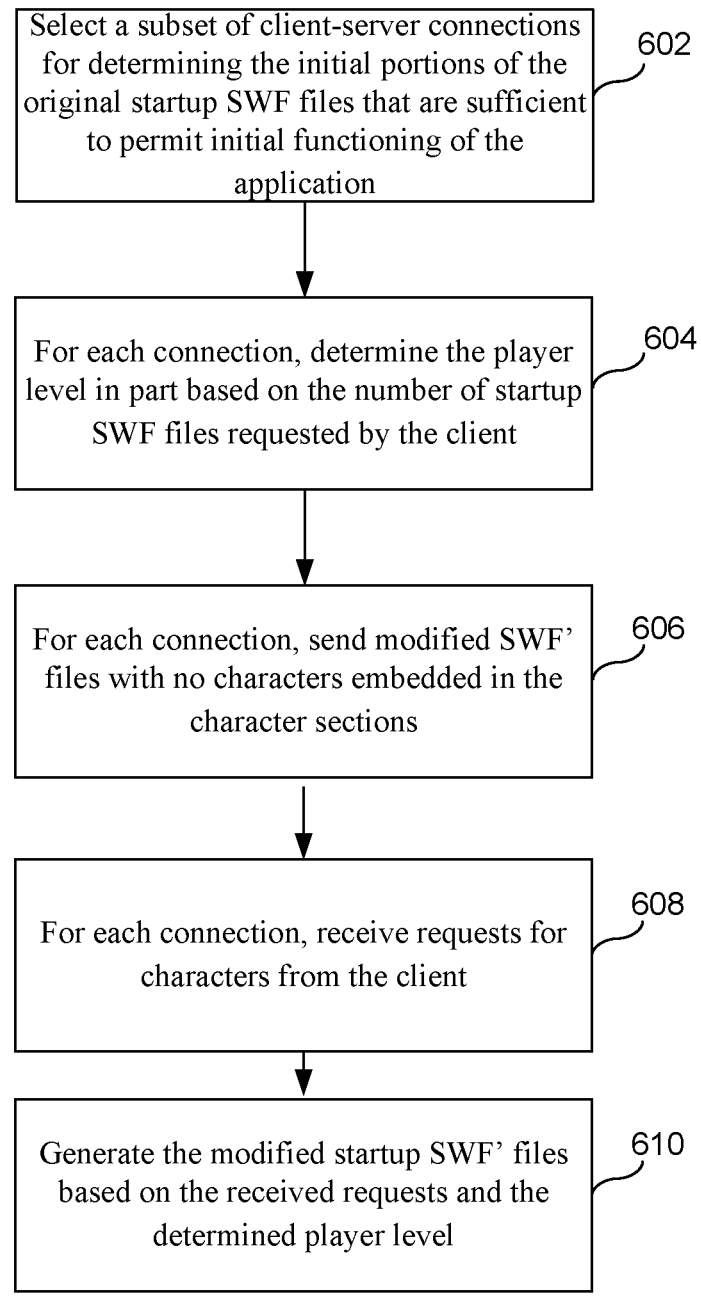
FIG. 6 is a diagram illustrating an embodiment of a profiling process 600 for determining the initial portions of original startup SWF files that are sufficient to permit initial functioning of the application in process 500.

FIG. 6 is a diagram illustrating an embodiment of a profiling process 600 for determining the initial portions of original startup SWF files that are sufficient to permit initial functioning of the application in process 500. At 602, a subset of client-server connections are selected for determining the initial portions of the original startup SWF files that are sufficient to permit initial functioning of the application. In some embodiments, only client-server connections that correspond to a specific client are selected, and the profiling process is for profiling a single client/game player. The results of the profiling process may be stored in a user metadata file or log. In some embodiments, only client-server connections that correspond to a specific group of clients are selected, and the profiling process is for profiling a single group of clients/game players. The results of the profiling process may be stored in a group-user metadata file or log. In some embodiments, the subset of client-server connections is in part selected based on the connection speed of those connections. For example, high-speed connections may be preferred in some embodiments. In some embodiments, the profiling process 600 is performed during a trial period, and the subset of client-server connections corresponds to the connections made during the trial period.

At 604, for each connection, the player level is determined in part based on the number of startup SWF files requested by the client. Using the FarmVille example, the number of SWF files for starting up the game on the client side and the contents of those SWF files are different for different player levels. Therefore, based on the number of startup SWF files requested, the server may determine the player level.

At 606, for each connection, modified SWF' files are sent with no characters embedded in the character sections of the modified SWF' files. Since the modified SWF' files do not have any characters embedded in the character sections of the files, the client needs to request for the characters that the application needs explicitly.

At 608, for each connection, requests for characters from the client are received. For example, if the game player chooses to plant a particular crop and the image file for the crop is not embedded in the character sections of the modified startup SWF' files, then the image file is accessed using a placeholder in one of the modified startup SWF' files. Assuming that the image file is not found locally, a request for the image file is sent through the network to the server.

At 610, modified startup SWF' files are generated based on the received requests and the determined player level. For example, if a particular crop is requested by 70% or more of the connections at player level #2, then the content corresponding to the crop is included in the character section of one of the modified startup SWF' files for player level #2; otherwise, the content corresponding to that crop is not included. In this way, modified SWF' files for different player levels can be generated based on the collected statistics. In some embodiments, the statistics collected by process 600 above can additionally be used for determining the distribution of partial SWF files in the hierarchy of caches as shown in FIG. 4. For example, if a partial SWF file is determined by process 600 to be frequently used for generating modified SWF' files for different clients, then a copy of the partial SWF file may be stored lower in the hierarchy of caches, e.g., at one or more of the plurality of edge servers (404 and 405).

In some embodiments, after the modified startup SWF' files are downloaded and the application is up and running, additional resources can be pushed from edge server 404 to client 102. These additional resources may be pushed to the client even if the client has not specifically requested for them. In some embodiments, the profiling process 600 may be used to determine the resources that are pushed and the order in which the resources are pushed. For example, characters that are frequently requested by game players at a particular player level but are not included in the modified start SWF' files can be pushed to the client using this method. For example, characters that are frequently requested at an earlier stage of the player level are pushed earlier. Pushing resources to the client trades increased bandwidth requirements for reduced network latency. Therefore, the determination of whether to push resources to the client in this manner or the kind of resources to push can be made based on different factors. For example, the determination can be based on the preferences of the game developer and/or the game player, the speed of the connection, and the device (e.g., a smartphone or laptop) on which the application is run.

As described above, the local caches of the various servers can be used to store partial files at different content granularity. For example, compared to other techniques in which the entire SWF file is cached, the servers may cache at the level of characters. The content granularity of the CDN is then a character. If a character changes, only the character needs to be distributed, as opposed to the entire SWF file. In some embodiments, the quality of the characters can be adapted based on the network bandwidth. For example, when the available bandwidth is limited, the image file of a character sent in a modified startup SWF' file can be a compressed image file.

Distributing content dynamically as described above reduces the quantity and the volume of the content that is distributed to the end-users. As a result, the downloading time and startup time are reduced. Because of the reduced network activities, battery consumption by the user devices (e.g., phones and tablets) is also reduced. In some embodiments, the client is installed in the firmware of the user devices, thereby providing faster and improved responses.

Figure 7:
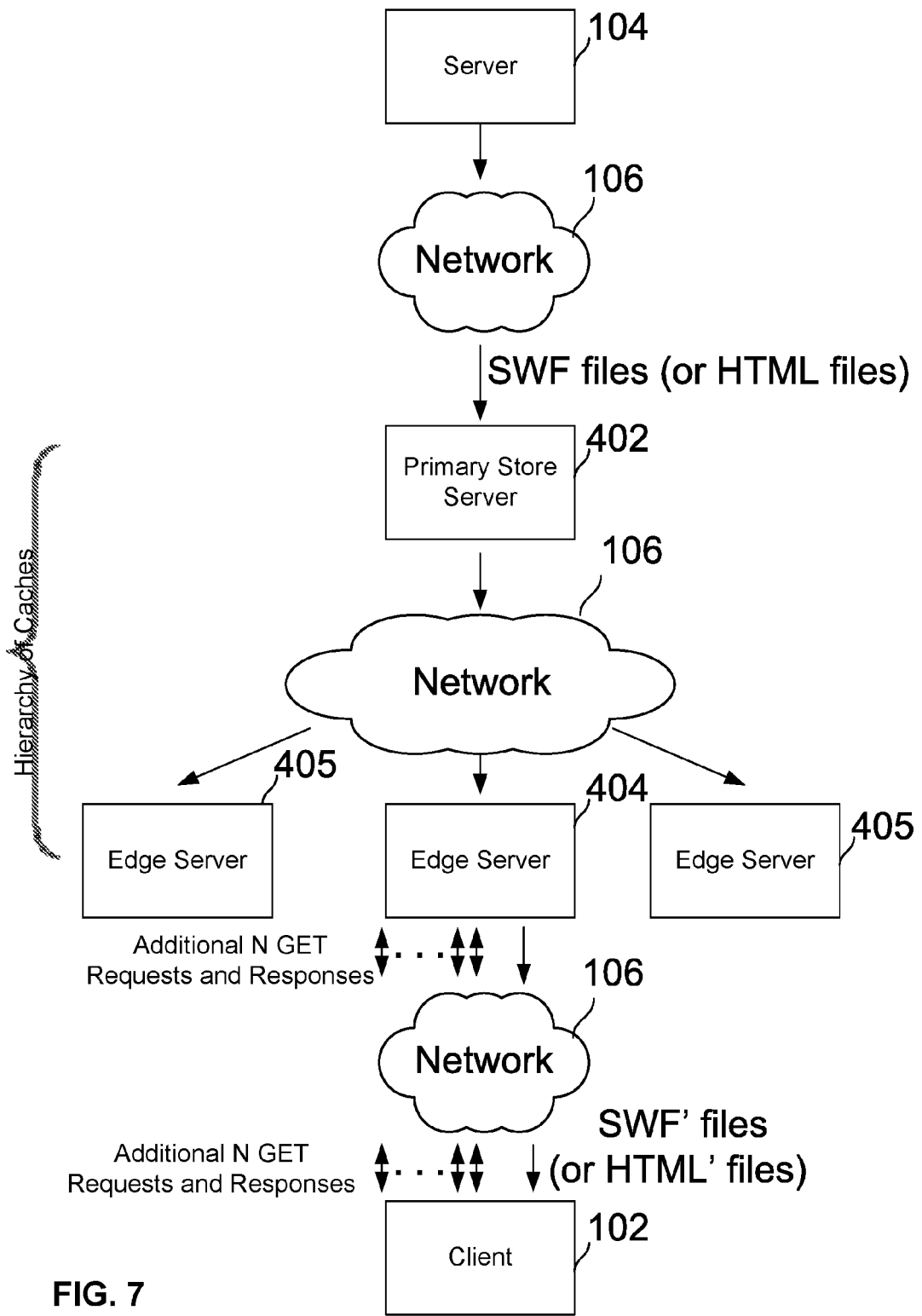
FIG. 7 is a diagram illustrating an embodiment of a client-server connection through a network for downloading files or content for starting or loading an application on the client side.

FIG. 7 is a diagram illustrating an embodiment of a client-server connection through a network for downloading files or content for starting or loading an application on the client side. The application includes game applications, web browsers, email protocols, collaborative applications (e.g., Microsoft Exchange), File Transfer Protocol (FTP), and the like. As described earlier in the present patent application, the modified startup files (e.g., modified startup SWF' files, modified startup HTML' files, and the like) dynamically generated by edge server 404 for an end-user (or a group of end-users) of the application contain portions of the original startup files. These initial portions provide resources for the initial functioning of the application. In some embodiments, the initial portions include links (e.g., hyperlinks) and/or uniform resource locators (URLs) that redirect the application to fetch additional dependent resources through the network from edge server 404 for the initial functioning of the application. When the application receives the modified startup files, for each of the links and/or URLs, the application sends a corresponding request to download a dependent resource from edge server 404 via network 106. In response, edge server 404 sends a response delivering the requested dependent resource to the application.

For example, the modified startup SWF' files that are received by the application may contain N different links and/or URLs. As shown in FIG. 7, after the application receives the modified startup SWF' files, N separate GET requests (e.g., N separate HTTP GET requests) are sent to edge server 404 requesting the edge server to download the dependent resources to the application. In response, N separate GET responses (e.g., N separate HTTP GET responses) are sent from edge server 404 back to the application, delivering the dependent resources to the application.

The round trip time or network response time for a GET request to arrive at edge server 404 and for its corresponding GET response to arrive at client 102 is dependent on the latency of network 106, which is different for different types of network. Network 106 may be any combination of different types of public or private networks, including intranets, local area networks (LANs), wide area networks (WANs), radio access networks (RANs), Wi-Fi networks, the Internet, and the like. Therefore, the latency associated with network 106 may vary depending on its network type(s).

Some networks have relatively lower network latency. For example, the network latency associated with WANs or Wi-Fi networks is relatively low, e.g., on the order of 10 milliseconds. Suppose the number of links and/or URLs included in the modified startup files, N, is equal to twenty. The total network latency associated with receiving the dependent resources associated with the twenty links and/or URLs from edge server 404, then, is approximately 200 milliseconds.

Some networks have relatively higher network latency. For example, the network latency associated with a $3^{rd}$ generation mobile telecommunications (3G) network, is relatively high, e.g., on the order of 100 milliseconds. In this instance, the total network latency associated with receiving the dependent resources associated with the twenty links and/or URLs from edge server 404 is then on the order of 2 seconds.

Since the network latency associated with different types of networks varies widely, and the application needs to receive the dependent resources associated with the links and URLs before the application can begin to startup, the startup wait time experienced by the end-user of the application may be insignificant in low-latency networks, such as Wi-Fi networks, but unacceptably long for an end-user in higher-latency networks, such as 3G networks. Therefore, improved techniques for reducing the round trip time described above would be desirable.

Figure 8:
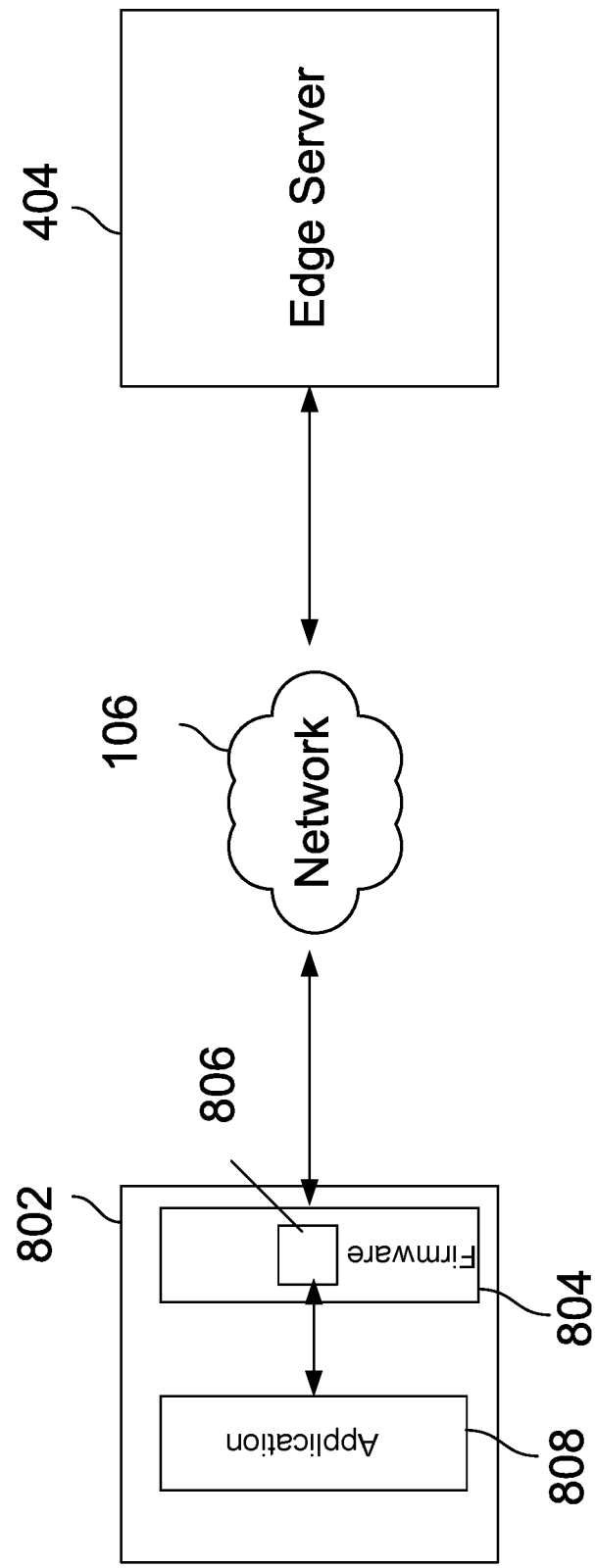
FIG. 8 is a diagram illustrating an embodiment of a client-server connection through a network for downloading files or content for starting or loading an application on the client side, wherein the application is running on a mobile device.

FIG. 8 is a diagram illustrating an embodiment of a client-server connection through a network for downloading files or content for starting or loading an application on the client side, wherein the application is running on a mobile device. For example, application 808 may be a web browser running on a mobile device 802, such as a smartphone, tablet computer, personal digital assistant (PDA), and the like.

As shown in FIG. 8, a piece of code or software 806 is installed into the firmware 804 of mobile device 802. In some embodiments, the piece of code 806 is a software plug-in installed into firmware 804 of mobile device 802. In some embodiments, different plug-ins may be used to handle different types of content. For example, SWF' files are directed to a SWF plug-in, and HTML5' files are directed to a HTML5 plug-in. Plug-in 806 intercepts messages that are sent between application 808 and edge server 404, and then further processes and forwards the intercepted messages. For example, HTTP messages that are sent by application 808 may be intercepted by plug-in 806. Once intercepted, the messages may be processed or forwarded by plug-in 806 in such a way as to minimize the round trip time described above. Note that the underlying communication protocol utilized between plug-in 806 and edge server 404 can be any one of many protocols, including proprietary protocols or standards-based protocols such as HTTP.

Figure 9:
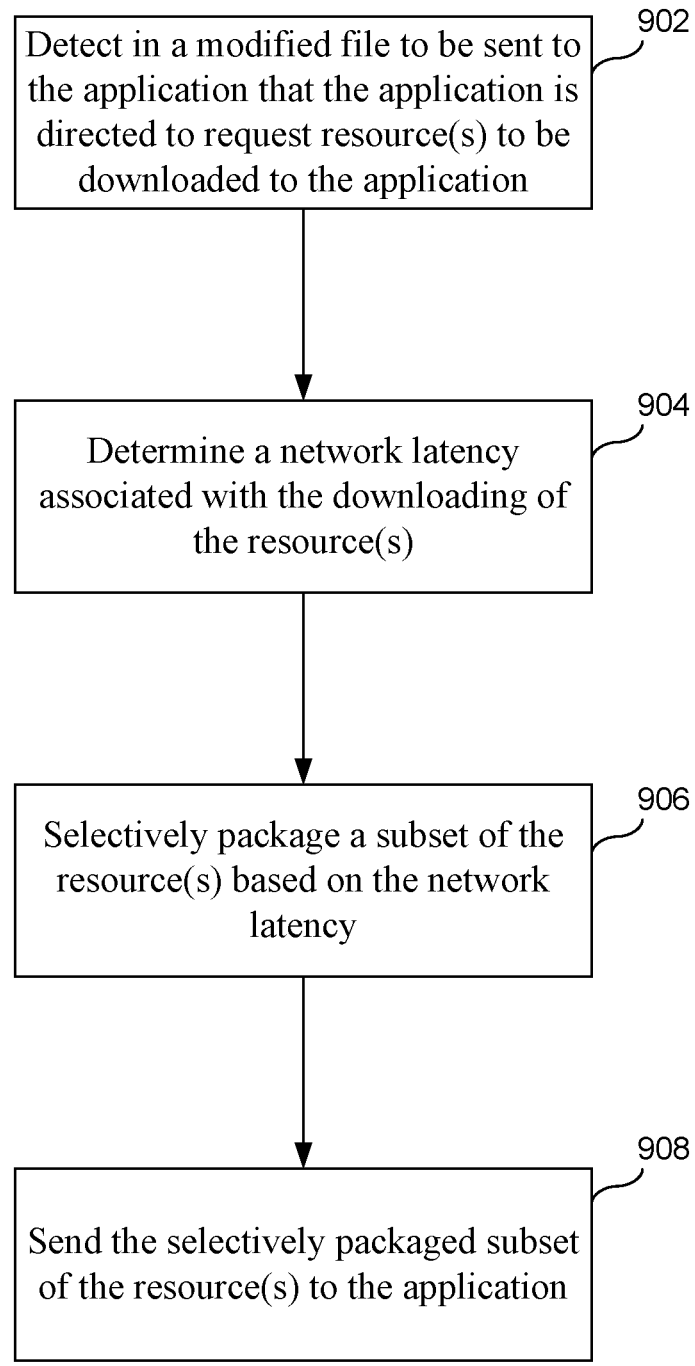
FIG. 9 is a diagram illustrating an embodiment of a process 900 for packaging dependent resources to be sent by the server to an application on the client side.

FIG. 9 is a diagram illustrating an embodiment of a process 900 for packaging dependent resources to be sent by the server to an application on the client side. In some embodiments, process 900 is a sub-process that is run between step 506 and step 508 of process 500 in FIG. 5.

At 902, the edge server detects in a modified startup file (e.g., a modified startup SWF' file or a modified startup HTML' file) that is going to be sent to the application from the server that the application is directed by the file to request one or more additional resources to be downloaded to the application. In some embodiments, the edge server detects redirections in the modified startup file. For example, redirections within the modified startup file direct the application to request additional dependent resources to be downloaded to the application by accessing links (e.g., hyperlinks) or URLs.

At 904, a network latency associated with the downloading of the one or more resources is determined. In some embodiments, the network latency is the round trip time or network response time for a GET request to arrive at the edge server and for its corresponding GET response to arrive at the client. In some embodiments, the network latency can be determined based on the type of connection between the server and the application. For example, the type of connection can include wireless connections, wireless connections on Wi-Fi networks, wireless connections on 3G networks, wired connections, wired connections on WANs, wired connections on LANs, and the like. In some embodiments, the type of connection is determined by the plug-in installed on the device on which the application is run. For example, during a handshake procedure between the plug-in and the server, the plug-in may determine the type of connection between the server and the application, and this information is then communicated to the server.

At 906, a subset of the one or more dependent resources is selectively packaged based on the determined network latency. In some embodiments, selectively packaging the subset of the one or more resources based on the network latency comprises packaging a larger subset of the one or more resources for higher network latency. For example, if the device on which the application is run is connected to the server on a 3G network, resulting in relatively higher network latency, then a larger portion of the dependent resources are packaged together. The packaged resources are then sent as a single batch through the network to the device, thereby reducing the total network latency required to deliver those dependent resources to the application. In another example, if the device on which the application is run is connected to the server on a Wi-Fi network, resulting in relatively lower network latency, then a smaller portion of the dependent resources are packaged together. In some embodiments, the server may determine in some cases that no packaging of the dependent resources is necessary because the network latency is not high enough to justify the additional cost of packaging the dependent resources at the server.

At 908, the selectively packaged subset of the one or more resources is sent to the application. In some embodiments, the selectively packaged subset of the one or more resources is sent from the server to a piece of software (e.g., a plug-in) installed on the device on which the application is run. The piece of software then processes the packaged resources before they are sent to the application. In some embodiments, the selectively packaged subset of the one or more resources and the modified startup file are sent from the server to the plug-in in a single message, e.g., a single HTTP response message. However, the packaged resources and the modified startup file can be sent in different messages as well. In some embodiments, dependent resources corresponding to multiple modified startup files can be packaged together and sent to the plug-in.

After the plug-in receives the packaged resources, the plug-in processes the packaged resources before they are sent to the application. In some embodiments, each of the resources is embedded into its corresponding modified startup file before the modified startup file is sent to the application. For example, if the modified startup file includes a redirection directing the application to download additional resources (e.g., images, audio clips, or videos) from an URL, then the redirection is replaced by the actual resources by embedding the resources in the modified startup file. In this case, the application does not need to send additional GET request messages to the server, thereby reducing the wait time experienced by the end-user of the application.

In some embodiments, the packaged resources are stored by the plug-in in a local memory on the device on which the application is run. For example, the packaged resources are stored by the plug-in in the local memory before the modified startup file is sent to the application. When the application parses the modified startup file and requests for the additional resources based on the redirection with the file, the plug-in may respond to the requests by retrieving the requested resources from the local memory and delivering them to the application. Since the requested resources are locally available at the device, no request messages need to be sent from the device to the server through the network, thereby reducing the wait time experienced by the end-user of the application.

In some embodiments, process 900 can be enabled or disabled based on the type of the application. For example, a total of twenty applications may be running on the mobile device. The device user or the service provider associated with the mobile device may configure a portion of the applications (e.g., five out of the twenty applications running on the device) as optimized applications, and these applications are optimized by running process 900. The remaining applications are configured as non-optimized applications, and process 900 is disabled for these applications.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer program product for distributing content to a web browser, the computer program product being embodied in a non-transitory computer readable storage medium and comprising computer instructions for:
    detecting in a file that the web browser is directed by the file to request one or more resources to be downloaded to the web browser, wherein the file is requested by the web browser to be sent to the web browser;
    determining a network latency associated with the downloading of the one or more resources; and
    in the event that the determined network latency associated with the downloading of the one or more resources is above a predetermined threshold:
        selectively packaging a subset of the one or more resources that the web browser is directed by the file to download; and sending in advance the selectively packaged subset of the one or more resources to a device on which the web browser runs without receiving one or more requests for the one or more resources.

2. The computer program product of claim 1, wherein selectively packaging the subset of the one or more resources is further based at least in part on a cost associated with the packaging.

3. The computer program product of claim 1, wherein sending the selectively packaged subset of the one or more resources to the device comprises sending the selectively packaged subset of the one or more resources to a piece of software executing on the device on which the web browser runs.

4. The computer program product of claim 3, further comprising computer instructions for sending the file to the piece of software executing on the device.

5. The computer program product of claim 4, wherein the selectively packaged subset of the one or more resources is embedded into the file by the piece of software before the file is sent by the piece of software to the web browser.

6. The computer program product of claim 4, wherein the selectively packaged subset of the one or more resources is stored in a memory on the device by the piece of software such that the selectively packaged subset of the one or more resources is sent to the web browser in response to the web browser requesting the subset of the one or more resources to be downloaded to the web browser.

7. The computer program product of claim 3, wherein the piece of software comprises a plug-in.

8. The computer program product of claim 1, wherein the device comprises a mobile device.

9. The computer program product of claim 1, wherein detecting in the file comprises detecting one or more redirections in the file, wherein the one or more redirections direct the web browser to request the one or more resources to be downloaded to the web browser using one or more of the following: a hyperlink and an URL.

10. The computer program product of claim 1, wherein the network latency is determined based at least in part on a type of connection between an edge server and the device on which the web browser runs.

11. The computer program product of claim 10, where the type of connection is determined by a piece of software executing on the device on which the web browser runs, and wherein the determined type of connection is communicated by the piece of software to the edge server.

12. The computer program product of claim 1, further comprising computer instructions for:
  determining that the file includes content related to executing an application;
  determining a first portion of the file that is likely to be required by the application for executing the application sooner than a second portion of the file; and
  generating a modified file based on the file, wherein the modified file includes the first portion of the file.

* * * * *